United States Patent
Hamaguchi (10) Patent No.: US 7,840,999 B2
(45) Date of Patent: Nov. 23, 2010

(54) IMAGE PROCESSING APPARATUS AND IMAGE PROCESSING METHOD

(75) Inventor: Kazuya Hamaguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1006 days.

(21) Appl. No.: 11/644,809

(22) Filed: Dec. 21, 2006

(65) Prior Publication Data

US 2007/0180253 A1   Aug. 2, 2007

(30) Foreign Application Priority Data

Feb. 1, 2006   (JP) ............................. 2006-024038

(51) Int. Cl.
   *G06F 21/00* (2006.01)
(52) U.S. Cl. ................ 726/17; 713/183; 713/184; 726/2; 726/4; 726/7; 726/19; 726/28; 726/30; 726/33
(58) Field of Classification Search ................ 713/183, 713/184; 726/2, 4, 7, 17, 19, 28, 30, 33
   See application file for complete search history.

(56) References Cited

U.S. PATENT DOCUMENTS

2003/0145219 A1 * 7/2003 Cossel et al. ................ 713/200
2006/0021012 A1 * 1/2006 Ito ................................ 726/5
2006/0274367 A1 * 12/2006 Yamamoto et al. ......... 358/1.15
2007/0083752 A1 * 4/2007 Kanou et al. ................ 713/156

FOREIGN PATENT DOCUMENTS

| JP | 09-297735 | 11/1997 |
| JP | 2002-055956 | 2/2002 |
| JP | 2005-244488 | 9/2005 |

* cited by examiner

*Primary Examiner*—Carl Colin
*Assistant Examiner*—Helai Salehi
(74) *Attorney, Agent, or Firm*—David G. Conlin; Steven M. Jensen; Edwards Angell Palmer & Dodge LLP (57) ABSTRACT

An image processing apparatus authorizing the use thereof by carrying out user authentication prevents fraudulent use of the processor and/or a data leak due to a user's forgetting invalidation of authentication or other reason. When a user is authenticated, whether the user is authorized to use a DMFP is determined by comparing the user's input information with the information of an access-authorized person stored in the DMFP. When both information matches, a range of functions available for the user are specified, and the user is authenticated. Subsequently, for example, operation of copy setting is carried out in making setting on the DMFP. When the setting operation is over, whether authentication on the user is invalidated is determined to execute processes of copy setting, etc. In response to a trigger of invalidation of authentication on the user, the processes of copy setting, etc., are started.

7 Claims, 9 Drawing Sheets

USER AUTHENTICATION — END — 16₄

ENTER PASSWORD

KEY OPERATOR CODE

KEY OPERATOR PROGRAM — OK — 16₆

- SECTION MANAGEMENT
- ENERGY SAVING SETTING
- OPERATION SETTING
- DEVICE SETTING — 16₅
- SYSTEM MANAGEMENT SETTING
- COPY SETTING
- FAX/IMAGE TRANSMISSION SETTING
- LIST/REPORT PRINT
- KEY OPERATOR CODE CHANGE
- PRODUCT KEY INPUT

FIG. 6

KEY OPERATOR PROGRAM
DEVICE SETTING — OK — 16₆

- SETTING ON MANUSCRIPT DETECTOR
- ☐ FORBID TO USE MANUSCRIPT FEEDER
- ☐ FORBID TO USE DOUBLE-FACE FUNCTION
- ☐ FORBID TO USE PAPER SUPPLY DESK
- ☐ FORBID TO USE E-MAIL MESSAGE STACKER
- SECURITY SETTING

IMAGE PROCESSING APPARATUS AND IMAGE PROCESSING METHOD

CROSS-NOTING PARAGRAPH

This Nonprovisional application claims priority under 35 U.S.C. §119(a) on Patent Application No. 2006-024038 filed in JAPAN on Feb. 1, 2006, the entire contents of which are hereby incorporated herein by references.

FIELD OF THE INVENTION

The present invention relates generally to an image processing apparatus and an image processing method, and more particularly, to an image processing apparatus and an image processing method that execute a process in response to a trigger of invalidation of authentication on a user when the authenticated user tries to cause the image processing apparatus to execute the process on data within an authorized range, so that the image processing apparatus is prevented from being left in the state without invalidating authentication on the user.

BACKGROUND OF THE INVENTION

These days, a number of digital Multi Function Peripherals (DMFPs) are installed in ordinary offices. A DMFP has functions of scanning, copying, printing, faxing, etc., and is equipped with a built-in hard disc, and connected to a network. Some of them are capable of higher functions including Web browsing and Java® applications. The DMFP, therefore, is used not only as a copier, printer, fax machine, etc., but also as a terminal device for document filing, network communication, etc. This makes it essential that the DMFP be provided with sufficient security measures against illegal use or data leaking.

Instances of security measures for the use of a DMFP include authentication using a password or information given by IC card, or human body authentication using human body information on a fingerprint, eyeball, etc. Such authentication is carried out to determine on whether a user is an authentic person who is authorized to use the DMFP. In an authentication process, a user's input of authentication information is compared with password/IC card information or human body information on fingerprints, eyeballs, etc., of an access-authorized person, the access-authorized person information being prerecorded in the DMFP. When the input information agrees with the prerecorded information, the user is authenticated, and is authorized to use the DMFP.

For example, when a user authorized to use a DMFP copies a manuscript, the manuscript is read by a scanner, and the read image data is stored in a built-in hard disc, and then a printed matter is put out using a copying function. When image information transmitted to the DMFP from an external information processor via a network is printed out, the image information from the external information processor is temporarily stored in the hard disc, and then a printed matter is put out using the printing function. The user must invalidate authentication on the user after obtaining the printed matter, etc., at the end of the process by the DMFP. This invalidation of authentication is imperative.

A user authorized to use a DMFP, however, may happen to fail to invalidate authentication on the user after the use of the DMFP because of forgetting the invalidation or other reasons. In such a case, as the authentication on the user remains effective, the DMFP mistakenly considers a person who is not entitled to authorization as a user authorized to use the DMFP.

Meanwhile, the hard disc of the DMFP keeps a part of previously processed image data unless the data is completely deleted. This leads to an accident that information involving the image data is printed out or transmitted out fraudulently to cause an information leak, thus ensuring security becomes difficult.

Related to user authentication on a conventional image processing apparatus, the DMFP disclosed in the Japanese Laid-Open Patent Publication No. 2005-244488, has been known. This DMFP provides an information reading unit that sends an electromagnetic signal to a user's portable memory card carried by a user into a detection area to read identification information of the user, a memory unit that stores the information that limits the use of function which is preset on the authenticated user on the basis of the identification information read out of the memory card, and a controlling unit that limits functions available for the authenticated user according to the information that limits the use of function extracted from the memory unit. The DMFP thus can set limitations in using various functions of the DMFP for each user.

SUMMARY OF THE INVENTION

An object of the present invention is to provide an image processing apparatus and an image processing method that offer superior security against fraudulent use of the image processing apparatus and a data leak due to a user's forgetting to invalidate authentication or other reasons for the image processing apparatus which authorizes the use thereof through user authentication.

Another object of the present invention is to provide an image processing apparatus that does not allow an excessively long period of authentication on a user, and that when a period of authentication on a user is unusually long, prompts the user to invalidate authentication while informing an administrator, etc., of the long authentication period, thus prevents a long period of fraudulent use of the image processing apparatus.

A still another object of the present invention is to provide an image processing apparatus that eliminates a concern of a leak of image data by deleting disused image data from the image processing apparatus after having executed a process on the image data.

A still another object of the present invention is to provide an image processing apparatus processing image data, comprising: an authenticating unit that authenticates a user and invalidates the authentication on the user; a limiting unit that limits a range of use of the image processing apparatus according to a level of authentication made by the authenticating unit; an authorizing unit that authorizes execution of a process within the range of use limited by the limiting unit; and an instructing unit that starts executing the process at a point that authentication on the user is invalidated by the authenticating unit.

A still another object of the present invention is to provide an image processing apparatus, in which the authenticating unit further providing a determining unit that determines an authentication continuation period after the authentication on a user.

A still another object of the present invention is to provide an image processing apparatus, wherein the authentication continuation period determined by the determining unit can be invalidated at any desired time.

A still another object of the present invention is to provide an image processing apparatus, further comprising a guide unit that puts out a guide display prompting invalidation of authentication after image data processing has been executed.

A still another object of the present invention is to provide an image processing apparatus, further comprising: a unit that sets information of a contact address; and a communication unit that sends various messages to the contact address, wherein the communication unit sends a message informing of invalidation of authentication on a user to the contact address, when detecting authentication on the user for a time longer than a given time after execution of image data processing.

A still another object of the present invention is to provide an image processing apparatus, further comprising a nullifying unit that nullifies image data processed completely when image data processing started by the instructing unit has been executed completely.

A still another object of the present invention is to provide an image processing method for an image processing apparatus processing image data, comprising the steps of: authenticating a user; limiting a range of use of the image processing apparatus according to a level of authentication that is made; authorizing execution of a process within the limited range of use of the image processing apparatus; invalidating authentication on the user; and starting execution of the process at a point that authentication on the user is invalidated.

PREFERRED EMBODIMENTS OF THE INVENTION

Figure 1:
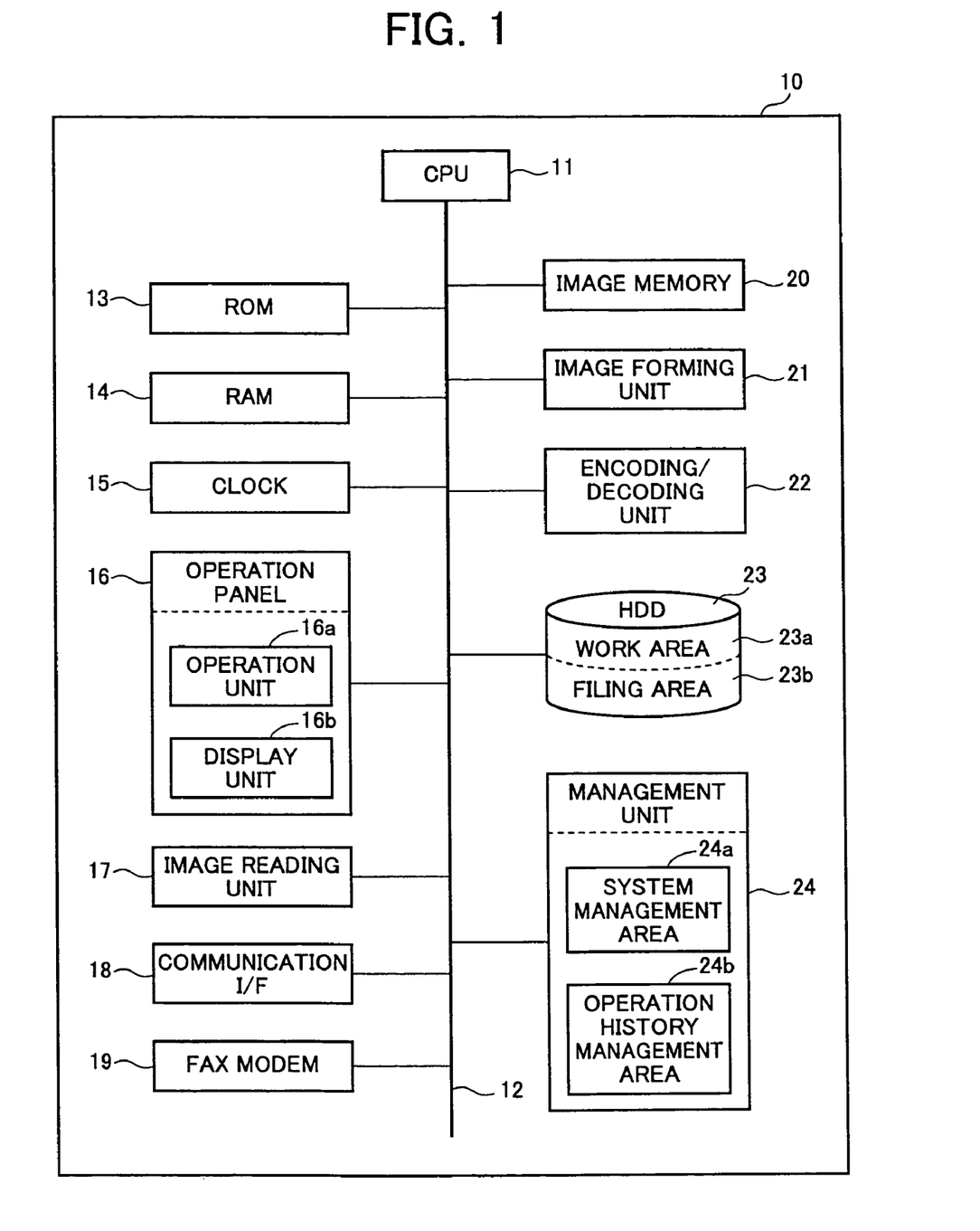
FIG. 1 is a block diagram of the internal structure of a DMFP to which the present invention applies.

Examples of an image processing apparatus according to the present invention for applying to a DMFP having functions of printing, copying, faxing, etc., are described on referring to FIGS. 1 to 14. FIG. 1 is a block diagram of the internal structure of a DMFP to which the present invention applies. The DMFP 10, to which the present invention applies, has a CPU 11, which loads a control program stored in a ROM 13 into a RAM 14 and executes the program to control hardware connected to the CPU 11 via a bus 12, thus causes the DMFP 10 as a whole to run as the image processing apparatus according to the present invention. In this DMFP 10, the instructions for adjustment of date information of a clock 15, setting the transmission destinations of various data, and setting whether or not the data is to be coded, etc., are received through an operation panel 16 which is described later, and these instructions are recorded as a history in the DMFP 10.

The structures of various pieces of hardware connected to the bus 12 are described below. The operation panel 16 includes an operation unit 16a that receives operations given by a user, and a display unit 16b that displays information to be given to a user. The operation unit 16a includes various operation keys and numerical keys for specifying a functional changeover, the number of papers printed out in a printing process, a magnification change in a copying process, a transmission destination in a fax transmission process, etc. The display unit 16b has a crystal display device, and displays the operating status of the DMFP 10 and the specified values and items given through the operation unit 16a. A part of the display unit 16b is provided with touch-panel type software keys, which are pressed by a user for selecting the values and items.

An image reading unit 17 includes a light source that emits light onto a manuscript to be read, an image sensor, such as a CCD (Charge Coupled Device), and an A/D converter (the light source, sensor, and converter are not shown). At the image reading unit 17, an image of a manuscript set at a given reading position is formed on the image sensor, and is converted into an analog electric signal, which is then converted into a digital signal by the A/D converter. Subsequently, the digital signal produced through A/D conversion is corrected with regard to the light distribution characteristics of the light source at the time of manuscript reading, the irregularity of sensitivity of the image sensor, etc., to generate digital image data.

A communication I/F (Interface) 18 has an interface conforming to a given communication standard for a local area network, etc., and allows an external computer to connect to the communication I/F 18. The communication I/F 18 receives a print job from the connected external computer, and sends information to impart to the computer. The communication I/F 18 thus controls transmission/reception of various data.

A fax modem 19 has a line terminating circuit for connecting an external fax machine enabling the DMFP 10 to carry out transmission/reception of facsimile data via a public telephone network. For facsimile data transmission/reception, the fax modem 19 has a decoding circuit that decodes received facsimile data, and a coding circuit that codes facsimile data to transmit. The fax modem 19 thus executes transmission/reception of facsimile data, and coding/decoding processes.

An image memory 20 is composed of a semiconductor memory, and temporarily stores image data generated through reading of an image on a manuscript by the image reading unit 17, image data developed from a print job, and image data developed from facsimile data. The image data stored temporarily in the image memory 20 is transferred to a transfer destination according to a purpose of use of the image data in pursuant to an instruction from the CPU 11. Specifically, the image data is transferred to an image forming unit 21 when an image is formed on a paper, to the fax modem 19 when the image data is transmitted as facsimile data, and to an HDD (hard disc unit) 23 when the image data is saved using a filing function.

The image forming unit 21 forms an image on a paper on the basis of image data transferred from the image memory 20. For use in image formation, the image forming unit 21 includes an electrifier that electrifies a photosensitive drum to give it a prescribed potential, a laser writing device that emits a laser beam onto the photosensitive drum according to received external image data to generate an electrostatic latent image on the photosensitive drum, a developer that develops the latent image by supplying toner to the electrostatic latent image formed on the surface of the photosensitive drum, and a transcription device that transfers a toner image formed on the photosensitive drum surface to the paper (the electrifier, writing device, developer, and transcription device are not shown). The image forming unit 21 thus forms an image desired by a user on the paper by an electrophotographic method. Besides the electrophotographic method using the laser writing device, an ink jet method, a heat transfer method, a sublimation method, etc., may be employed for image formation by the image forming unit 21.

An encoding/decoding unit 22 encodes data to be stored in the HDD 23, and decodes data to be read out of the HDD 23. For encoding/decoding, the encoding/decoding unit 22 includes an input buffer that receives input data to be encoded or decoded, an operation device that executes an operation process using a prescribed encoding algorithm on the data set in the input buffer, and an output buffer that retains an operation result from the operation device. Data to be encoded or decoded is put into the input buffer. The data is taken out from the input buffer and is processed by the operation device and then the operation result is written in the output buffer when the operation process is completed. The CPU 11 takes the data having undergone the operation process out of the output buffer to obtain the data that is encoded or decoded by the encoding/decoding unit 22.

The HDD 23 is a hard disc unit having a disc-like magnetic recording medium. A part of a memory area of the HDD 23 is used as a data area for storing image data, etc. The HDD 23 reads out the image data stored in the data area when receiving a request for the data through the operation panel 16 or a request for the data from an external computer via the communication I/F 18. When a re-execution of a printing process is required due to a failure in the printing process, or insufficient number of printed out copies, etc., the HDD 23 randomly reads out the image data stored in the data area for allowing re-execution of the printing process.

The data area is divided into a work area 23a and a filing area 23b. The work area 23a has a capacity determined to be smaller than that of the filing area 23b. For that reason, the work area 23a is used mainly as an area for temporarily storing the data on process. When a vacant memory space in the work area 23a becomes smaller, data staying in the work area 23a for a certain time is automatically transferred to the filing area 23b to be stored therein. The filing area 23b stores data by arranging it for each file format of the data, for each process mode of the printer function, scanner function, copier function, facsimile function, etc., or for each folder made by a user. The filing area 23b keeps the data stored therein unless receiving a deletion instruction, etc.

A management unit 24 is composed of a nonvolatile semiconductor memory. A part of the memory area of the management unit 24 serves as a system management area 24a that stores information of the status of the DMFP 10, various setting received through the operation panel 16, etc., and serves as an operation history management area 24b that stores the history of various setting.

Figure 2:
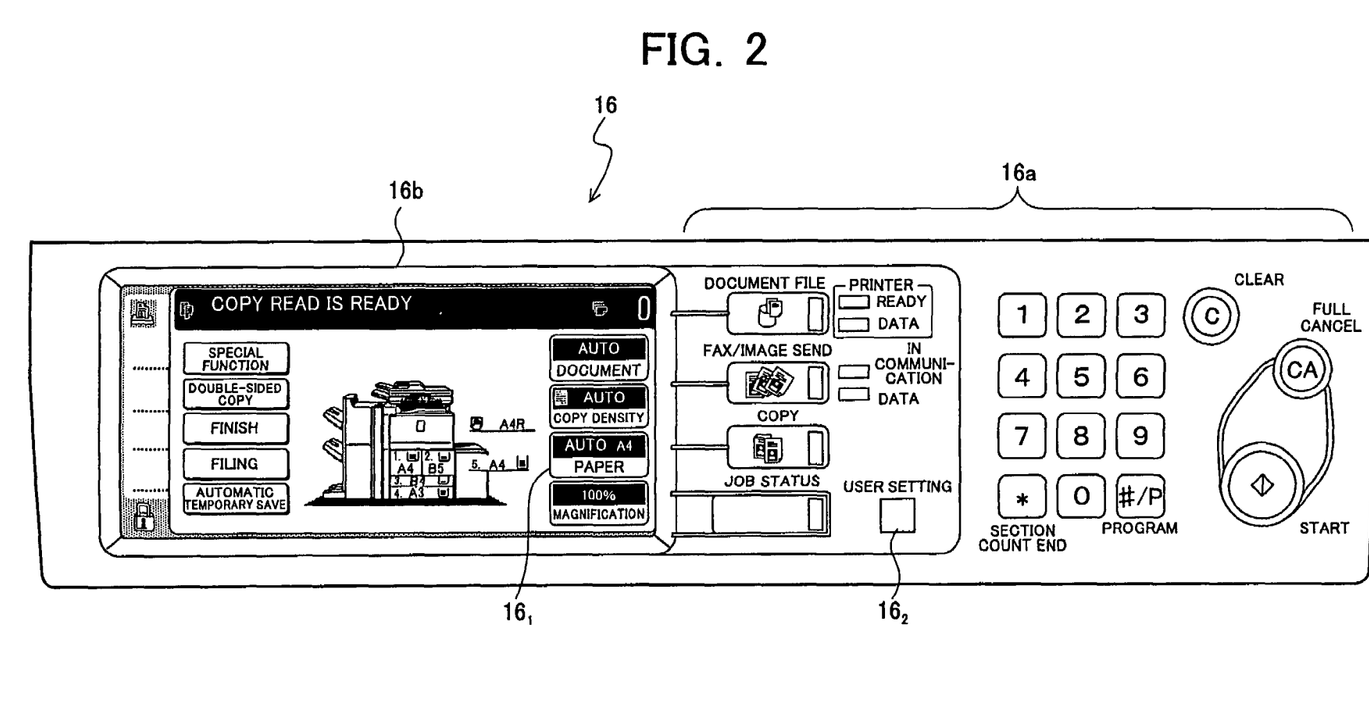
FIG. 2 depicts an operation panel of the DMFP, which is in a copy mode.

The operation panel of the DMFP is described below. FIG. 2 depicts the operation panel of the DMFP, the panel displays the situation that the DMFP is in a copy mode.

The operation panel 16 shown in FIG. 2 includes the operation unit 16a and the display unit 16b. The display unit 16b is composed of, for example, a dot-matrix type liquid crystal panel, and is capable of displaying information to be given to a user in detail. The screen of the liquid crystal panel is provided with a transparent touch panel, which is operated by the user according to the information displayed on the liquid crystal panel. The touch panel is a component of the operation unit 16a for putting instruction information into the DMFP.

In addition to the touch panel, the operation unit 16a also has a group of keys disposed next to the liquid crystal panel, which keys include a start key for giving a copy start instruction, a clear all key for interrupting a process in progress, a clear key for clearing the contents of a specified mode, numerical keys for specifying the number of copies, etc., a mode changeover key, and a user setting key.

The display unit 16b stands by with a basic screen image displaying a "copy mode" as an initial screen image. An external view of the DMFP is displayed in the approximate center of the basic screen image, where the system configuration of the DMFP (large-capacity paper supply unit, finisher unit, etc.) can be visually recognized. Information on a selected mode, a selected paper supply tray, image formation, etc., is also displayed in the basic screen image.

The upper part of the display unit 16b is occupied with a message display area that informs a user of the status of the DMFP, and advices for the user, etc. The right part of the display unit 16b is occupied with a group of keys displayed for selecting a basic function (mode) of the DMFP. The left part of the display unit 16b is occupied with a group of keys displayed for selecting a special function (mode) incorporated into the DMFP.

Figure 3:
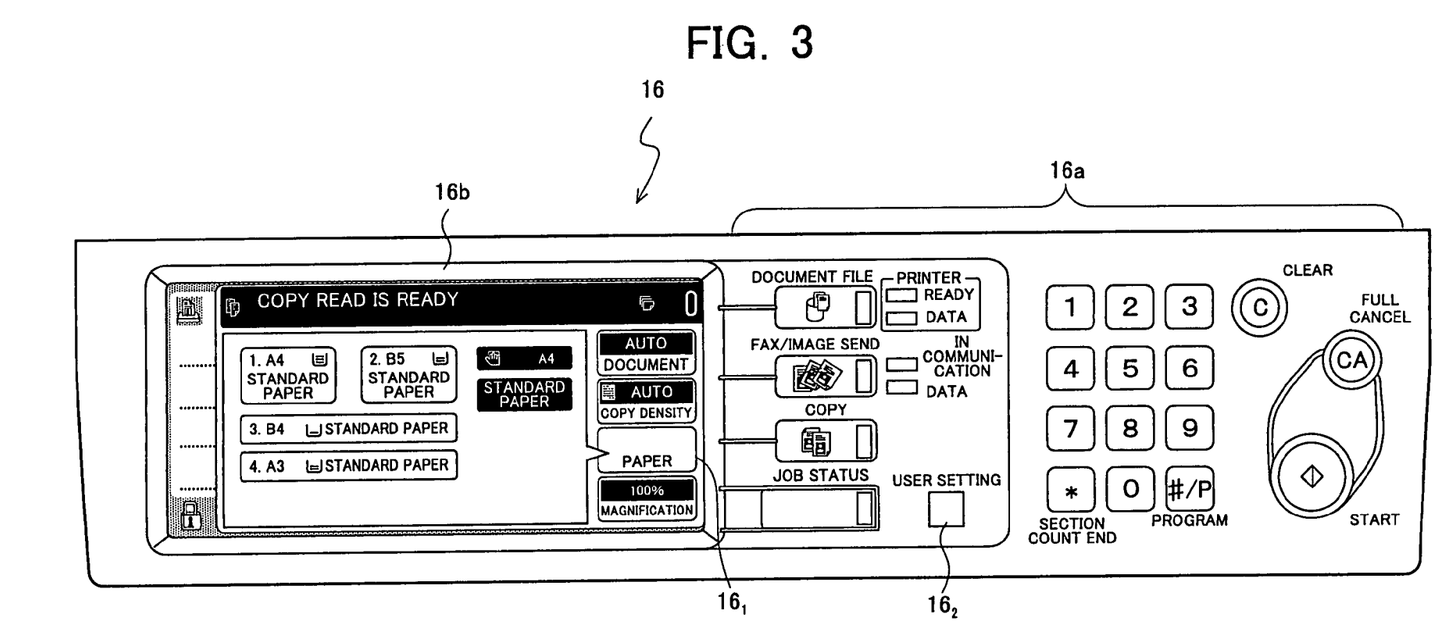
FIG. 3 depicts the operation panel of the DMFP, which executes an instruction of a changeover of paper supply during the copy mode.

FIG. 3 depicts the operation panel of the DMFP. And this screen image on the panel shows the display for specifying changeover in paper supply during the copy mode. When a "paper" key among the key group for selection of a basic function (mode) is pressed on the operation panel 16 shown in FIG. 2, a new window for specifying changeover in paper supply appears on the display unit 16b, as shown in FIG. 3. The window shown in FIG. 3 displays a group of tray information keys indicating information of papers (size, residual amount, paper quality, etc.) that are stored in the first to the fourth cassette and a large-capacity cassette, and displays a "tray change" key, in addition to the message display area and the key group for selection of a basic function (mode).

First Embodiment

Operation for causing a DMFP to execute user authentication and then mode setting is described below. In operating a DMFP of a first embodiment, a user presses the "user setting" key displayed on the operation unit 16a of the operation panel 16 shown in FIG. 2 before starting to use the DMFP. The press on the user key brings a user authentication screen image into display on the display unit 16b, and shifts an operation mode to a user information input mode.

Figure 4:
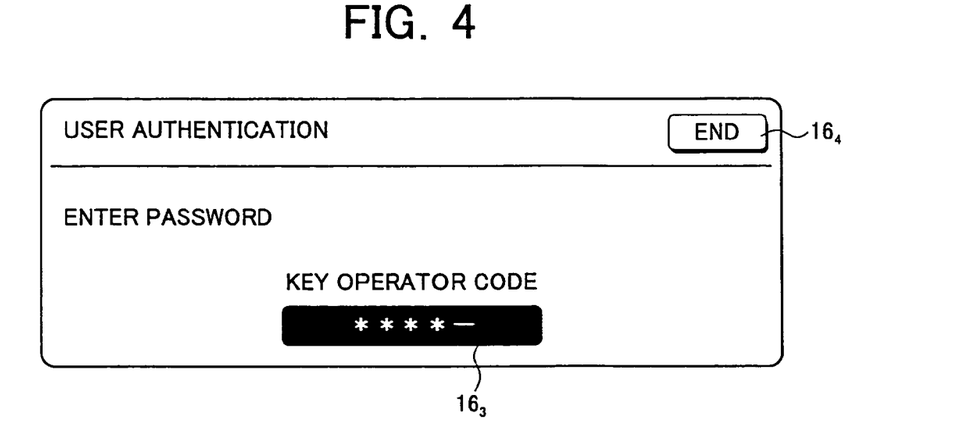
FIG. 4 depicts a user authentication screen image put out by the DMFP of a first embodiment in a user information input mode.

FIG. 4 depicts the user authentication screen image put out by the DMFP of the first embodiment in the user information input mode. When a user puts a specific key operator code, i.e., password, into a key operator code input space, the CPU 11 in the DMFP 10 identifies the user, determines an access level authorized to the user at the present point according to the category of the user, and determines on which function among several functions of the DMFP is to be authorized for execution. For example, in consideration of a security level, the CPU 11 authorizes an operator A to execute functions F1 to F3 of level 1, authorizes an operator B to execute functions F1 to F5 of level 1 through level 2, and authorizes an administrator C to execute all functions F1 to F8 of level 1 through level 3.

Figure 5:
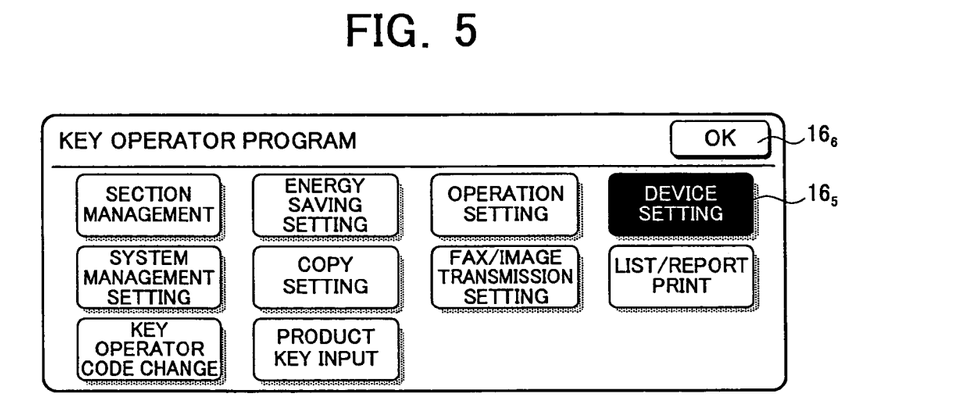
FIG. 5 depicts a key operator program screen image.

FIG. 5 depicts a key operator program screen image. When the user enters the key operator code with given digits and presses an "end" key on the user authentication screen image shown in FIG. 4, the key operator program screen image appears. For device setting, the user then presses a "device setting" key to put it in reverse display, as shown in FIG. 5, and then presses an "OK" key on the key operator program screen image. This brings a device setting screen image on the display.

Figure 6:
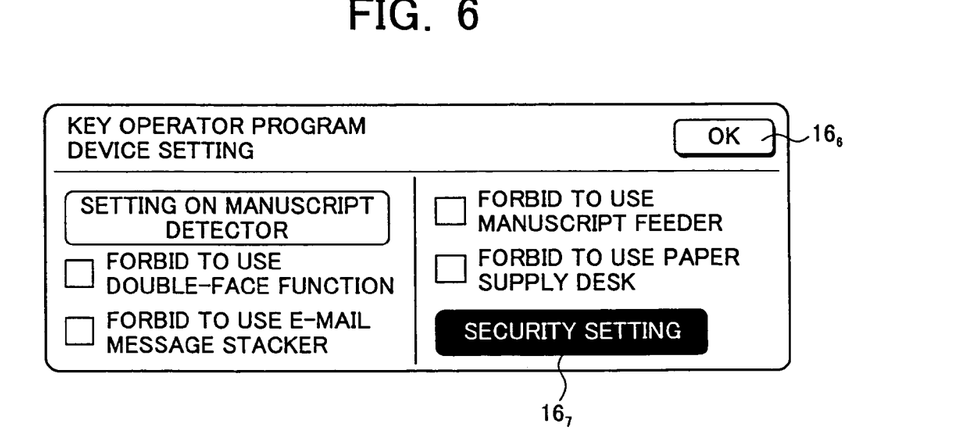
FIG. 6 depicts a device setting screen image.

FIG. 6 depicts the device setting screen image. For setting on various security measures for the DMFP, the user presses a "security setting" key and then presses an OK key on the device setting screen image shown in FIG. 6. This brings a security setting screen image on the display.

Figure 7:
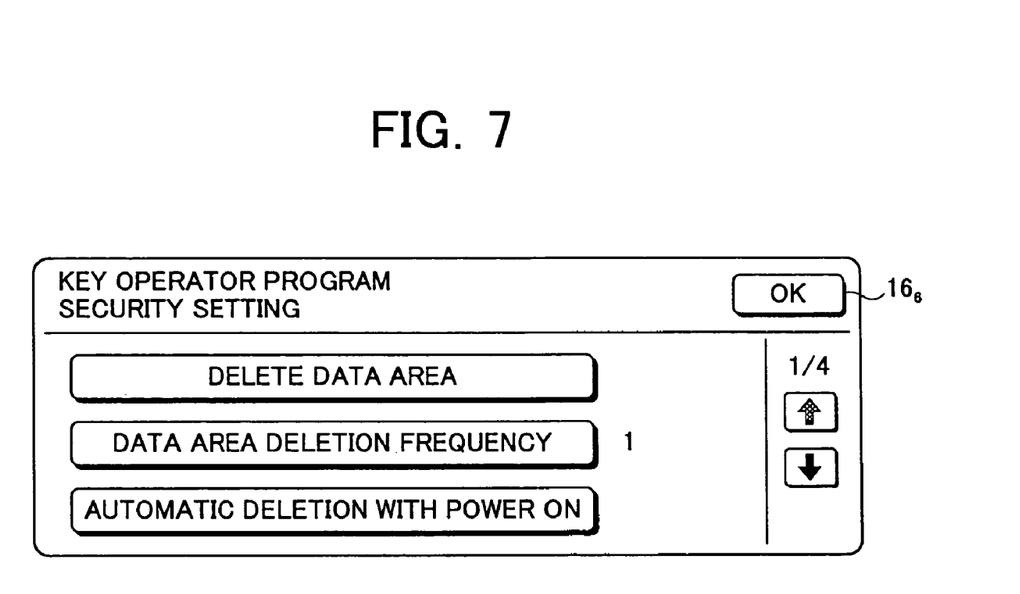
FIG. 7 depicts a security setting screen image.

FIG. 7 depicts the security setting screen image. Though the security setting screen image shown in FIG. 7 consists of four screen images, only the top image of the four is shown in FIG. 7. When the user enters a necessary matter for every item to set the detail of security and then presses an OK key on the screen image shown in FIG. 7, a key operator program screen image shown in FIG. 8 appears.

Figure 8:
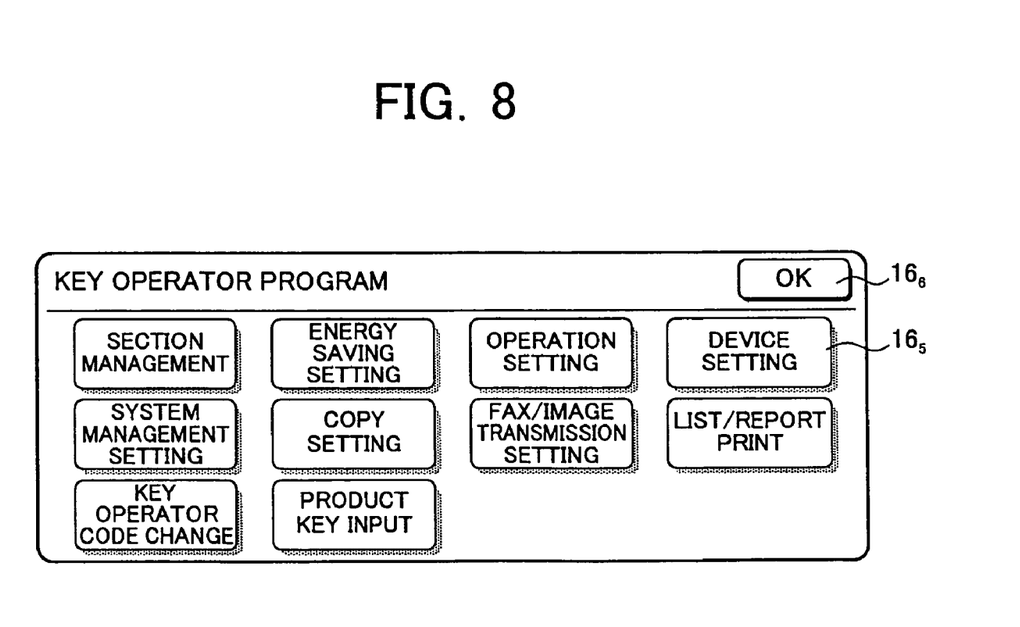
FIG. 8 depicts a key operator program screen image.

FIG. 8 depicts the key operator program screen image. The key operator program screen image shown in FIG. 8 is identical with the key operator program screen image shown in FIG. 5. Pressing a proper key other than the device setting key allows additional setting on each item according to the pressed key. But for the simplicity of the explanation, it is assumed here that a user authentication invalidation screen image shown in FIG. 9 appears when the user presses an OK key.

Figure 9:
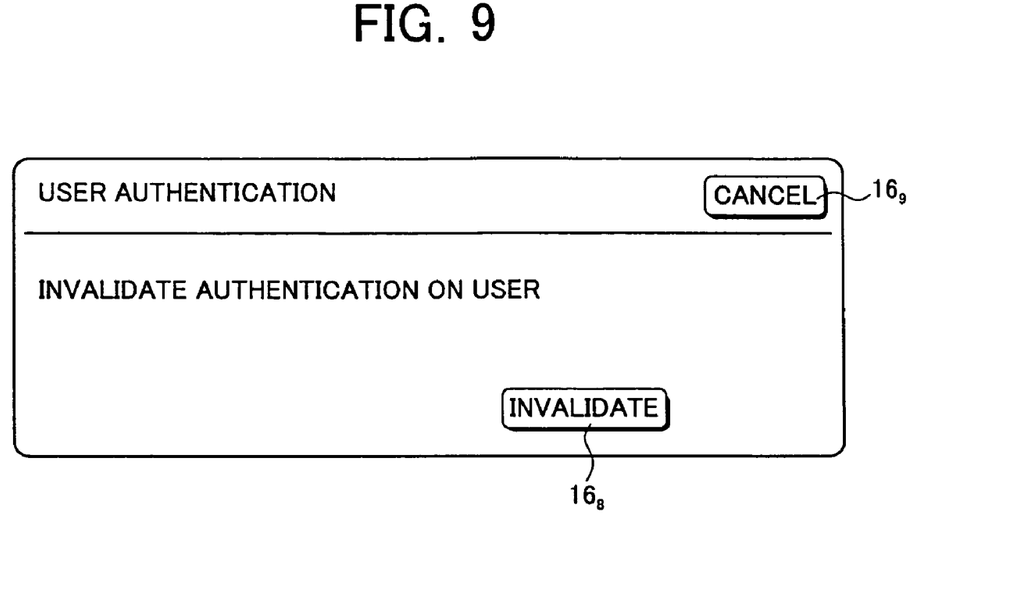
FIG. 9 depicts a user authentication invalidation screen image.

FIG. 9 depicts the user authentication invalidation screen image. At the point that the user authentication invalidation screen image shown in FIG. 9 is displayed, user authentication has already been carried out on the user authentication screen image shown in FIG. 4. Because of this, the user authentication invalidation screen image shown in FIG. 9 bears a display prompting the user to invalidate authentication on the user. When the user presses an "invalidation" key to invalidate the authentication according to the display, authentication on the user is invalidated, and the setting mode ends. On the other hand, when the user does not want to invalidate the authentication because a setting error has been made, the user presses a "cancel" key.

Upon invalidation of authentication on the user, the invalidation triggers execution of processes specified by the user, that is, execution of the device setting made on the screen image shown in FIG. 6 and of the security setting made on the screen image shown in FIG. 7.

According to the image processing apparatus of the first embodiment, various setting processes on the image processing apparatus or such a process as printing are started in response to a trigger of invalidation of authentication on a user. This eliminates a concern about an accident that authentication on the user is not invalidated even after the completion of execution of the processes, thus enables the prevention of fraudulent use of the image processing apparatus by an unauthenticated person and of a data leak.

Second Embodiment

Operation for causing a DMFP to execute user authentication and then a print job is described below. The DMFP of the first embodiment maintains a state of authentication once authenticating a user unless the authentication is invalidated. If this state of authentication continues, a person not authorized to use the DMFP is free to use the DMFP illegally. The person, therefore, may fraudulently extract saved data from the DMFP, or communicate with a terminal device not authorized to communicate with. This poses a problem in terms of security management. To solve such a problem, a DMFP of a second embodiment has a determining unit that determines an authentication continuation period after the authentication on a user becomes effective, and invalidates authentication on the user when the authentication continuation period has run out.

Figure 10:
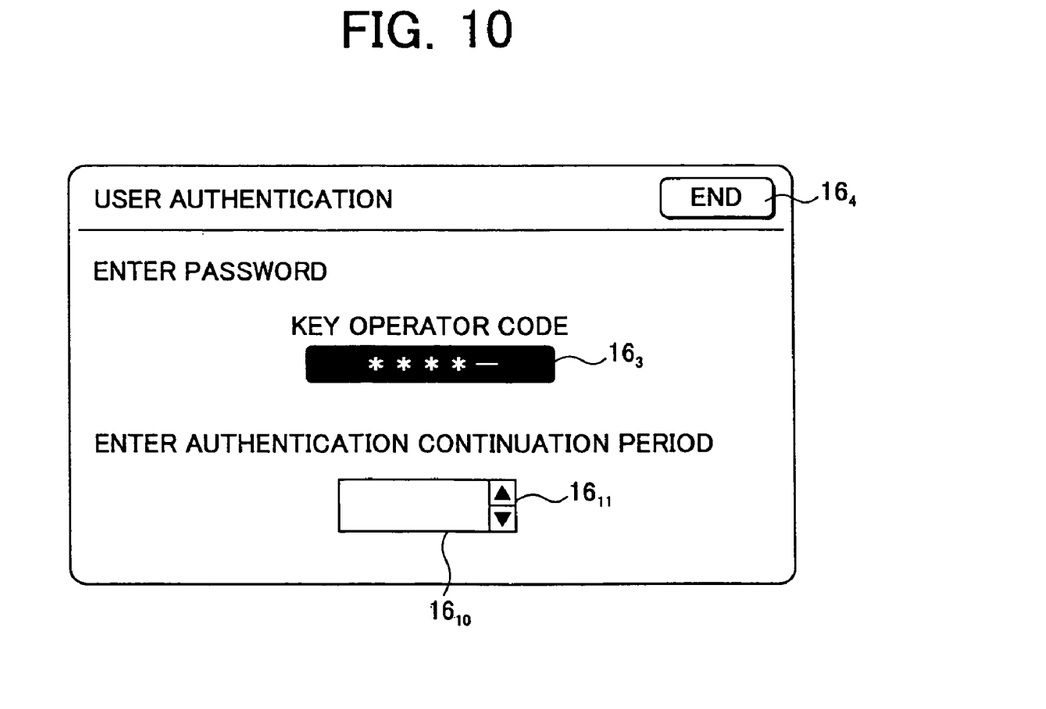
FIG. 10 depicts a user authentication screen image put out by a DMFP of a second embodiment in the user information input mode.

The DMFP of the second embodiment executes user authentication and then a print job in the manner described below. In the following description, a user instructs the DMFP to process a plurality of print jobs. FIG. 10 depicts a user authentication screen image put out by the DMFP of the second embodiment in the user information input mode. A user causes the DMFP to display the user authentication screen image shown in FIG. 10, and then puts his or her specific key operator code, i.e., password, in a key operator code space. When the user is authenticated by the DMFP, the user inputs an authentication continuation period (time), during which the authentication remains effective, in an authentication continuation time space. Input of the authentication continuation time is made by pressing up/down keys properly, and is rendered effective by pressing an "end" key. As a result, the DMFP identifies the user, determines an access level authorized to the user according to the category of the user at the present point, and determines on which function among functions of the DMFP is to be authorized for execution and on how long authentication continues after the authentication on the user becomes effective.

Figure 11A:
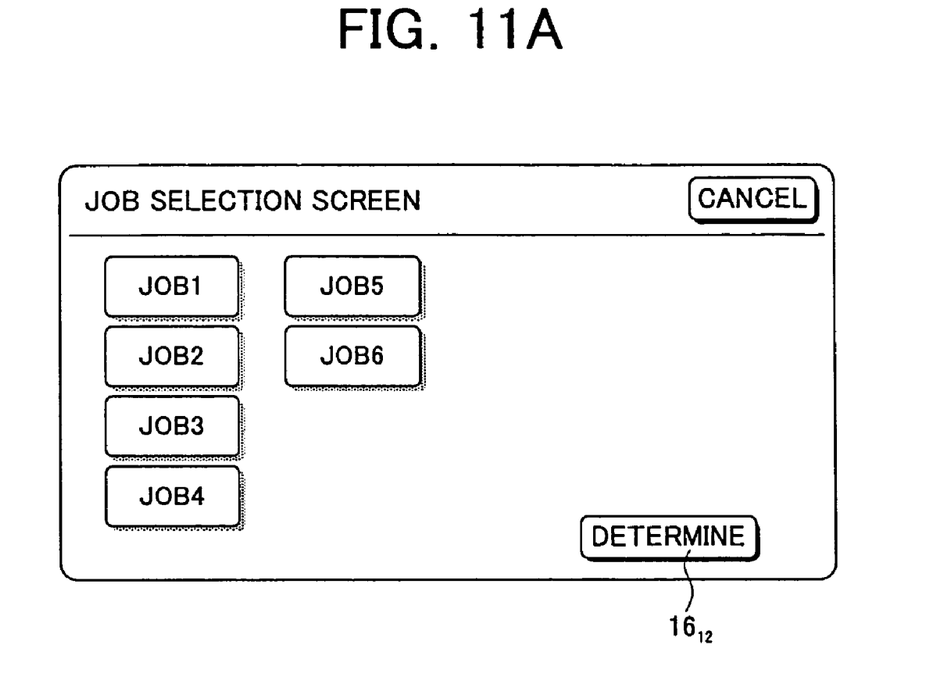
FIGS. 11A and 11B depict job selection screen images.
Figure 11B:
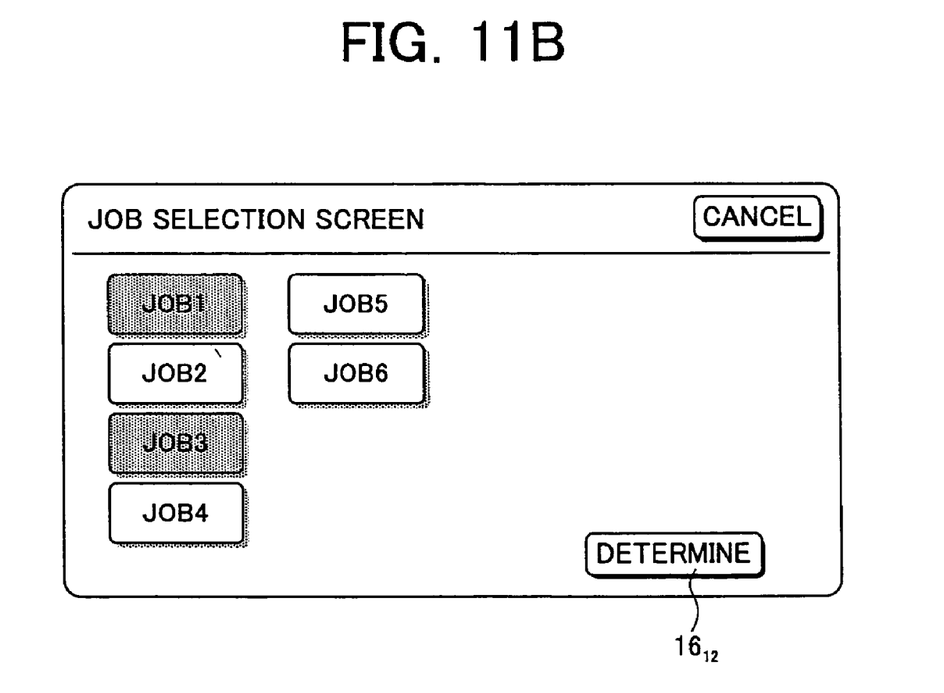
Figure 12:
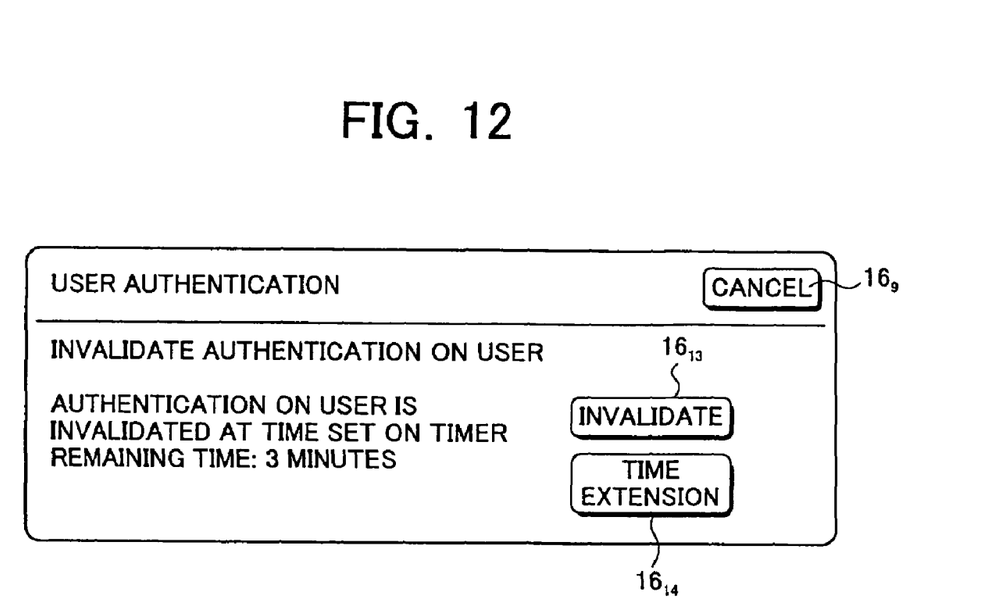
FIG. 12 depicts a user authentication invalidation screen image.

FIGS. 11A and 11B depict job selection screen images, and FIG. 12 depicts a user authentication invalidation screen image. After user authentication accompanying determination of the authentication continuation period (time) has been carried out, the user, for example, causes the DMFP to display a plurality of files as print jobs on the job selection screen image shown in FIG. 11A, and specifies files to be printed out. The files specified to be printed out are displayed in color, as a JOB 1 and JOB 2 shown in FIG. 11B. When a "determine" key is pressed at this point, the screen display is changed into the user authentication invalidation screen image shown in FIG. 12.

The user authentication invalidation screen image shown in FIG. 12 bears the display of a time of continuation of authentication at the present point. For example, when the user understands that three minutes are left to the end of the authentication continuation period and makes a judgment that the print jobs will be completed within the remaining three minutes, the user presses an "invalidation" key to invalidate authentication on the user. This invalidation of authentication on the user triggers execution of every print job specified, that is, execution of printing of JOB 1 and JOB 2. If a "cancel" key is pressed, the screen display returns to the job selection screen image shown in FIGS. 11A and 11B, which allow the user to select a job again.

Figure 13:
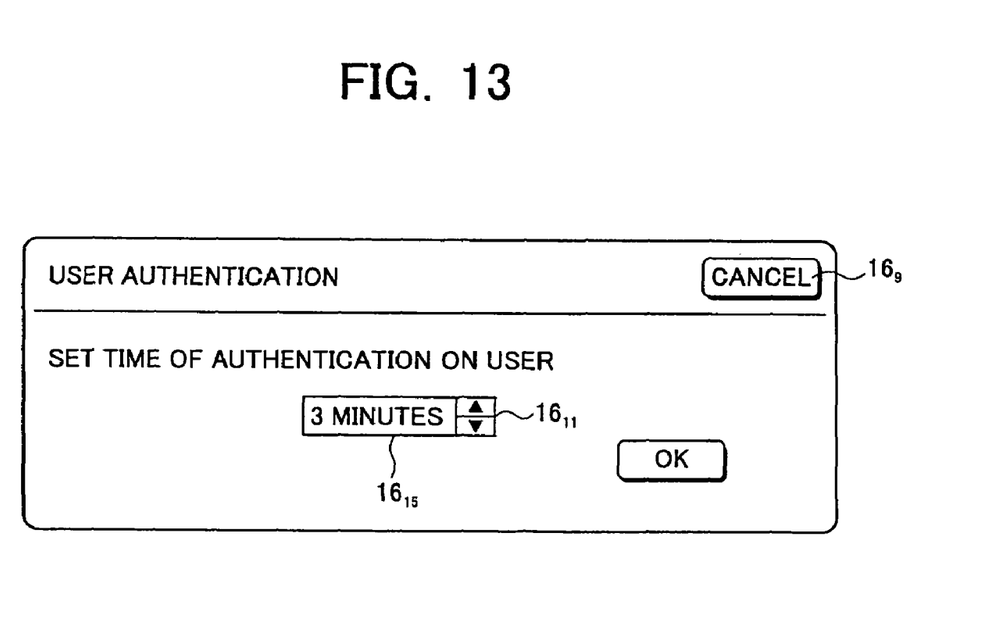
FIG. 13 depicts an authentication period extension screen image.

FIG. 13 depicts an authentication period extension screen image. On the user authentication invalidation screen image shown in FIG. 12, for example, if the user makes a judgment that the print jobs will not be completed within three minutes left in the authentication period, the user presses a "time extension" key to display the authentication period extension screen image shown in FIG. 13. The user is allowed to change setting of the authentication period to increase (or decrease) the remaining time by pressing up/down keys properly on the screen display. When a "cancel" key is pressed, on the other hand, the screen display returns to the user authentication invalidation screen image shown in FIG. 12, where the user makes a choice between re-invalidation of authentication on the user and extension of the authentication period.

Figure 14:
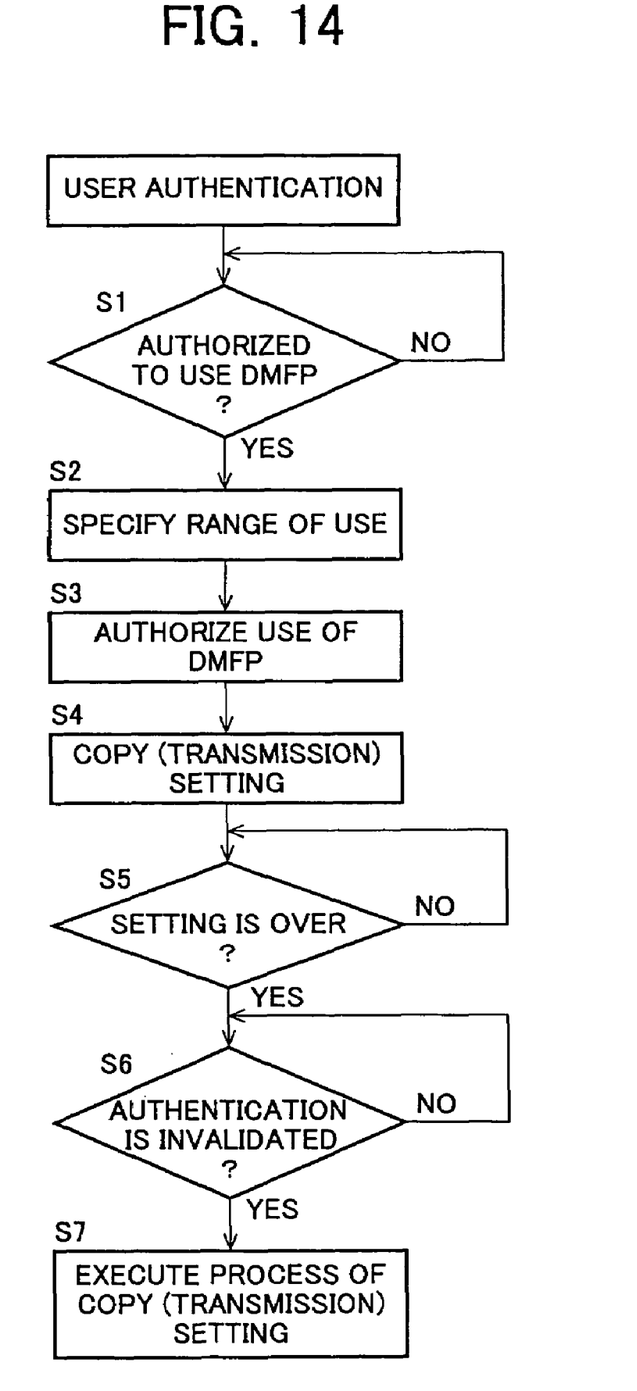
FIG. 14 is a flowchart for the DMFP to follow in authenticating a user and executing setting processes.

FIG. 14 is a flowchart for the DMFP to follow in authenticating a user and executing setting processes. The flowchart represents a series of processes according to the first embodiment. In authenticating a user, the DMFP determines on whether the user is authorized to use the DMFP by comparing the user's input information of a password, an IC card, fingerprint, etc., with access-authorized person information stored in the DMFP (step S1). When both information matches, the DMFP defines a range of functions of the DMFP available for the user (step S2), and authenticates the user, then authorizes the user to use the DMFP in the defined range (step S3).

Subsequently, the user carries out input operation, for example, copy setting and transmission setting, etc., in making various setting on the DMFP (step S4). When the setting operation is over (step S5), the DMFP determines on whether authentication on the user made at step S3 is invalidated before proceeding to execution of processes of copy setting and transmission setting, etc (step S6). Given a trigger of invalidation of authentication on the user, the DMFP then starts executing the processes of copy setting and transmission setting, etc., made at step S4 (step S7).

The present invention offers the following effects. The image processing apparatus processing image data according to the present invention includes an authenticating unit that authenticates a user and invalidates authentication on the user, a limiting unit that limits a range of use of the image processing apparatus according to a level of authentication made by the authenticating unit, an authorizing unit that authorizes execution of a process within the range of use limited by the limiting unit, and an instructing unit that starts executing the process at a point that authentication on the user is invalidated by the authenticating unit. The image processing apparatus starts executing a setting process, printing process, etc., in response to a trigger of invalidation of authentication on the user. This eliminates such an accident that authentication on the user is not invalidated even after the completion of execution of the processes, thus enabling the prevention of fraudulent use of the image processing apparatus and of a data leak due to the user's forgetting to invalidate the authentication or other reason. The image processing apparatus also offers another advantage of minimizing a time of holding image data in the image processing apparatus.

The authenticating unit has a determining unit that determines an authentication continuation period after the authentication. When the image processing apparatus is left as it is without invalidation of authentication on a user after user authentication, therefore, the authentication is invalidated when the authentication continuation period has run out or can be invalidated any time by the determining unit. Thus, the image processing apparatus is not kept in a state of authenticating a user for an excessively long period, which prevents illegal use of the image processing apparatus.

The image processing apparatus also has a unit that sets contact address information, and a communication unit that sends out various messages based on the contact address information. The communication unit sends a message informing of invalidation of authentication on a user to a contact address when detecting authentication on the user for a time longer than a given time after execution of a process on one image data. This enables an administrator, etc., to know such a case that abnormal use of the image processing apparatus is going on.

The image processing apparatus further has a nullifying unit that nullifies image data processed completely when the instructing unit starts processing the image data and then completes processing. Because of this, the image data stored in a hard disc, etc., in the image processing apparatus is deleted without fail after execution of the process, which prevents the image data from leaking out of the image processing apparatus.

The invention claimed is:

1. An image processing apparatus processing image data, comprising:
    an authenticating unit that authenticates a user, and invalidates an authentication of the user upon the user selecting an invalidation key on a setting screen;
    a limiting unit that limits a range of use of the image processing apparatus according to a level of the authentication made by the authenticating unit;
    an authorizing unit that authorizes execution of a process within the range of use limited by the limiting unit; and
    an instructing unit that starts executing the process at a point that the authentication of the user is invalidated by the authenticating unit.

2. The image processing apparatus as defined in claim 1, in which the authenticating unit further providing a determining unit that determines an authentication continuation period after the authentication of the user.

3. The image processing apparatus as defined in claim 2, wherein the authentication continuation period determined by the determining unit can be invalidated at any desired time.

4. The image processing apparatus as defined in claim 1, further comprising a guide unit that puts out a guide display prompting invalidation of the authentication after image data processing has been executed.

5. The image processing apparatus as defined in claim 1, further comprising:
    a unit that sets information of a contact address; and
    a communication unit that sends various messages to the contact address, wherein
    the communication unit sends a message informing of invalidation of the authentication of the user to the contact address, when detecting authentication of the user for a time longer than a given time after execution of image data processing.

6. The image processing apparatus as defined in claim 1, further comprising a nullifying unit that nullifies image data processed completely when image data processing started by the instructing unit has been executed completely.

7. An image processing method for an image processing apparatus processing image data, comprising the steps of:
    authenticating a user;
    limiting a range of use of the image processing apparatus according to a level of authentication that is made;
    authorizing execution of a process within the limited range of use of the image processing apparatus;
    invalidating the authentication of the user upon the user selecting an invalidation key on a setting screen; and
    starting execution of the process at a point that the authentication of the user is invalidated.

* * * * *